(12) United States Patent
Martin

(10) Patent No.: US 11,648,894 B2
(45) Date of Patent: May 16, 2023

(54) FAUX DISTRIBUTOR CABLE HOLDER

(71) Applicant: Lokar, Inc., Knoxville, TN (US)

(72) Inventor: Elio Martin, Litchfield, OH (US)

(*) Notice: Subject to any disclaimer, the term of this patent is extended or adjusted under 35 U.S.C. 154(b) by 0 days.

(21) Appl. No.: 17/335,147

(22) Filed: Jun. 1, 2021

(65) Prior Publication Data

US 2022/0009427 A1    Jan. 13, 2022

Related U.S. Application Data

(60) Provisional application No. 63/032,184, filed on May 29, 2020.

(51) Int. Cl.
*B60R 16/02* (2006.01)
*F01M 13/00* (2006.01)

(52) U.S. Cl.
CPC ......... *B60R 16/0215* (2013.01); *F01M 13/00* (2013.01); *F01M 2013/0038* (2013.01)

(58) Field of Classification Search
CPC .. H01R 13/405; H01R 13/707; H01R 13/512; H01R 13/748; H01R 13/641; H01R 2201/26; H01R 2105/00; E02F 9/2075
See application file for complete search history.

(56) References Cited

U.S. PATENT DOCUMENTS

| | | | | |
|---|---|---|---|---|
| 2,987,587 A * | 6/1961 | Estes | .................. | F02P 7/025 174/397 |
| 3,861,068 A * | 1/1975 | Zygmunt | ................ | B60R 16/02 40/673 |
| 4,434,618 A * | 3/1984 | Dillon | ..................... | F03G 7/065 60/527 |
| 5,188,537 A * | 2/1993 | Itoh | ..................... | H01R 13/639 123/169 PH |
| 5,213,520 A * | 5/1993 | Casey | .................. | H01R 13/748 439/712 |
| 10,012,330 B1 * | 7/2018 | Thomas | .................... | B64C 3/00 |
| 2014/0148026 A1 * | 5/2014 | Nomura | ................ | E02F 9/2075 439/188 |
| 2018/0248275 A1 * | 8/2018 | Morita | .................... | B60L 53/16 |
| 2022/0010706 A1 * | 1/2022 | Martin | .................. | F01M 13/04 |

* cited by examiner

*Primary Examiner* — John Kwon
(74) *Attorney, Agent, or Firm* — Blanchard Horton PLLC

(57) ABSTRACT

A cable holder for securing a plurality of vehicle engine cables while simulating a vehicle engine distributor comprises a shaft portion and a cap portion provided at a top of the shaft portion. The cap portion cooperates with the shaft portion to define a central passageway therethrough. At least one opening is provided proximate a bottom of the shaft portion and opening to the central passageway, and a plurality of upper apertures are provided proximate a top of the cap portion and opening to the central passageway. A hollow path is formed between the at least one lower aperture and plurality of upper apertures to channel a plurality of vehicle engine cables through the cable holder.

16 Claims, 6 Drawing Sheets

FAUX DISTRIBUTOR CABLE HOLDER

CROSS-REFERENCE TO RELATED APPLICATIONS

This application claims priority to U.S. Provisional Patent Application Ser. No. 63/032,184, filed on May 29, 2020, the entirety of which is incorporated herein by reference.

FIELD OF INVENTION

The present general inventive concept relates to a simulated ignition system distributor, and, more particularly, to a simulated distributor to hold various cables of a fuel injection system.

BACKGROUND

As known in the automotive industry, over the last several decades fuel injection systems have replaced carburetors as the standard fuel system in internal combustion engines. These fuel injection systems have eliminated various components that were present in the carburetor-based systems, such as a centrally located ignition coil, distributor and distributor cap, etc. Many automobile enthusiasts, such as car customizers and "hot rod" builders/drivers, lament some of the various aesthetics that have been lost to these technological advances. Thus, these enthusiasts may desire simulated components to recreate those lost components, and ones in which may perform a beneficial function along with their aesthetics.

BRIEF SUMMARY

According to various example embodiments of the present general inventive concept, a simulated distributor cable holder is provided to organize various cables of a fuel injection system while presenting the look of a distributor of a distributor ignition system.

Additional aspects and advantages of the present general inventive concept will be set forth in part in the description which follows, and, in part, will be obvious from the description, or may be learned by practice of the present general inventive concept. The foregoing and/or other aspects and advantages of the present general inventive concept may be achieved by providing a cable holder for securing a plurality of vehicle engine cables while simulating a vehicle engine distributor. According to various example embodiments of the present general inventive concept, the cable holder may comprise a shaft portion, a cap portion provided at a top of the shaft portion, the cap portion cooperating with the shaft portion to define a central passageway therethrough, at least one lower aperture proximate a bottom of the shaft portion and opening to the central passageway, and a plurality of upper apertures provided proximate a top of the cap portion and opening to the central passageway. A hollow path is formed between the at least one lower aperture and plurality of upper apertures to channel a plurality of vehicle engine cables through the cable holder.

In various example embodiments, the shaft and cap portions may be shaped to resemble a vehicle engine distributor shaft and a vehicle engine distributor cap. The at least one lower aperture may be formed at a substantially right angle to a longitudinal axis of the shaft portion. The at least one lower aperture may extend away from the shaft portion. The plurality of upper apertures may include a predetermined number of apertures formed proximate and about a perimeter of the top of the cap portion. The apertures formed proximate and about the perimeter of the cap portion may each be configured to pass a spark plug cable therethrough. In various example embodiments, the plurality of upper apertures may include a central aperture formed proximate a center of the top of the cap portion. The central aperture may be configured to pass a crankcase breather hose therethrough. In various embodiments, the cable holder may further comprise a base plate formed provided proximate the bottom of the shaft portion and configured to mount the cable holder to a surface. The base plate may be formed separately from the shaft portion.

Various example embodiments of the present general inventive concept may provide a cap holder in which an outer surface of the cap portion defines a substantially cylindrical shape having a plurality of semi-cylindrical protrusions extending therefrom. In various embodiments, each of the semi-cylindrical protrusions defined by the cap portion outer surface may define an axial dimension extending coaxial with a central axis of the cap portion. The cap portion may further define a plurality of truncated conical protrusions extending from a top surface of the cap portion. In various embodiments, each truncated conical protrusion may have a central axis coaxial with a central axis of a corresponding semi-cylindrical protrusion. A top surface of each truncated conical protrusion may define one of the upper apertures. The cap portion may further define a central truncated conical protrusion extending from a center of the top of the cap portion. The central truncated conical protrusion may define a central aperture opening to the central passageway. The central aperture may be configured to pass a crankcase breather hose therethrough. In various embodiments, the cable holder may further comprise a forward fixture mounted proximate an interface of the shaft portion and the cap portion. The forward fixture may comprise an annular, truncated conical collar portion having a flared end facing toward the interface between the cap portion and shaft portion, and a tapered end facing outwardly therefrom, and a hexagonal nut portion adjacent the tapered end of the collar portion. The hexagonal nut portion may have a central axis oriented coaxially with a central axis of the collar portion.

Other features and aspects may be apparent from the following detailed description, the drawings, and the claims.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which.

DETAILED DESCRIPTION

Figure 1:
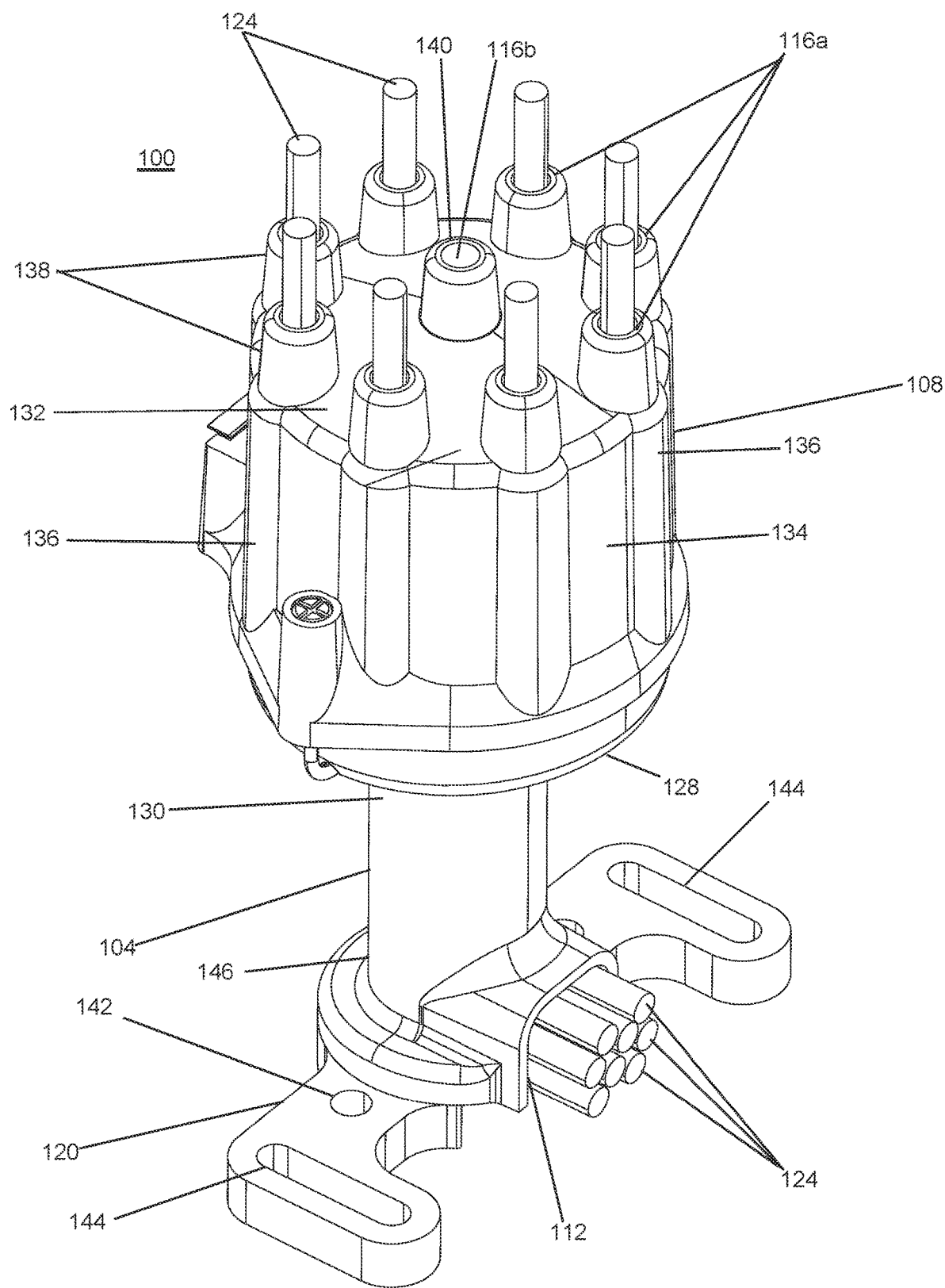
FIG. 1 illustrates a perspective view showing upper and rear surfaces of a simulated distributor cable holder according to an example embodiment of the present general inventive concept.

Reference will now be made to the example embodiments of the present general inventive concept, examples of which are illustrated in the accompanying drawings and illustrations. The example embodiments are described herein in order to explain the present general inventive concept by referring to the figures.

The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be simplified and/or omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

According to various example embodiments of the present general inventive concept, a cable holder is provided to organize various cables of a fuel injection system, including spark plug wires leading from the individual coils of the fuel injection system to the respective spark plugs of the system, and to maintain such cables in an organized fashion. It is understood that the terms "wires" and "cables" may be used interchangeably herein, and typically refer to the spark plug wires leading from ignition coils to the spark plugs. The cable holder, sometimes referred to herein as a "faux" or "simulated" distributor cable holder, is formed to have the appearance of a distributor that would be included in a distributor ignition system. Thus, while holding and maintaining the cables in an organized fashion, the cable holder further serves to mask the appearance of the cables, disguising the cables as components of an older style distributor ignition system. Various example embodiments of the cable holder may also be formed to hold and maintain a crankcase breather hose, pipe, wire, hose, etc.

FIGS. 1-4 illustrate various perspective views of a simulated distributor cable holder according to an example embodiment of the present general inventive concept. As shown in FIGS. 1-4, the simulated distributor cable holder 100 is formed to have the appearance of a distributor. The cable holder 100 includes a shaft portion 104 with a cap portion 108 formed at a top of the shaft portion 104. The shaft portion 104 and cap portion 108 cooperate to define a substantially hollow interior passageway through which a plurality of spark plug cables 124 may be received. As illustrated, an exterior of the cap portion 108 is formed to appear as a distributor cap, which would typically have various components inside such as a rotor, condenser, etc., as to deliver a charge through the spark plug cables to the spark plugs connected thereto. However, the faux distributor cap portion 108 of this example embodiment has no such inner componentry, but rather is formed to hold and maintain a plurality of spark plug cables run therethrough in the guise of being a working distributor cap. Similarly, the shaft portion 104 is formed so as to appear as a working distributor shaft.

A lower aperture 112 is provided at or near the lower end 146 of the shaft portion 104 and opening to the interior passageway defined by the shaft portion 104 and cap portion 108. The lower aperture 112 is configured so as to receive spark plug cables running from ignition coils and to serve as an ingress for the spark plug cables to the interior passageway of the cable holder 100. In various example embodiments, the lower aperture 112 may be formed at a substantially right angle and extending away from the longitudinal axis of the shaft portion 104. In other various example embodiments, the lower aperture may be formed directly in the bottom of the shaft portion 104, or extending away at an angle, and so on. Various example embodiments of the present general inventive concept may have two or more lower apertures, such as, for example, lower apertures extending outward from a lower part of the shaft portion from opposite sides, to receive spark plug cables more conveniently from coils mounted from different areas proximate the engine.

In the illustrated embodiment, a base plate 120 is provided along a lower end of the cable holder 100. The base plate 120 is configured to be attached to an engine block of a vehicle engine in a manner similar to a conventional distributor, and thus to allow the cable holder 100 to be mounted to a vehicle engine block. In the illustrated embodiment, the base plate 120 is formed with a variety of fixing means, such as for example through holes 142 and slots 144 configured to receive therethrough one or more threaded fasteners for mounting the base plate 120 to a surface, and may be formed integrally or separately from the shaft portion 104 of the cable holder 100.

The cap portion 108 is defined by a substantially cylindrical hollow body member having a lower circular end 128 opening to an upper end 130 of the shaft portion 104. An upper circular end 132 of the cap portion 108 defines a substantially flat surface having a plurality of upper apertures 116a, 116b provided therein. Each of the upper apertures 116a, 116b opens to the substantially hollow interior passageway defined by the shaft portion 104 and cap portion 104. Thus, the substantially hollow interior passageway, along with the upper apertures 116a, 116b and lower aperture 112, cooperate to define at least one hollow path through the shaft portion 104 and cap portion 108 to channel spark plug cables 124 in through the lower aperture 112, through the shaft portion 104 and cap portion 108, and out through at least one of the upper apertures 116a, 116b, which are configured to pass the spark plug cables therethrough while resembling the fit of a conventional distributor cap.

In this example embodiment, an exterior curved surface 134 of the cylindrical cap portion 108 defines a plurality of semi-cylindrical protrusions 136 extending radially outwardly from the exterior curved surface 134 of the cylindrical cap portion 108, with axes of the semi-cylindrical protrusions extending in a direction parallel to a central axis of the cylindrical cap portion 108. For each semi-cylindrical protrusion 136, a substantially hollow, truncated conical protrusion 138 is defined extending from the upper circular end of the cap portion 108. In the depicted embodiment, each truncated conical portion 138 aligns coaxially with one of the semi-cylindrical protrusions 136, and each corresponding set of coaxial truncated conical protrusions 138 and semi-cylindrical protrusions 136 is evenly spaced from adjacent sets of truncated conical protrusions 138 and semi-cylindrical protrusions 136 about the perimeter of the cylindrical cap protrusion 108.

In the illustrated embodiment, the upper apertures 116a, 116b include a plurality of perimetral upper apertures 116a, with one perimetral upper aperture 116a being defined by each upper end of each truncated conical protrusion 138. Thus, the perimetral upper apertures 116a are arranged about a perimeter of the upper surface of the cap portion 108 in an evenly spaced configuration about the perimeter of the cylindrical cap portion 108, such spacing corresponding to the spacing of the corresponding truncated conical protrusions 138 and corresponding semi-cylindrical protrusions 136. Each of the perimetral upper apertures 116a is sized and configured to allow a corresponding one of the spark plug cables 124 to pass therethrough. Thus, each perimetral upper aperture 116a provides a separate channel through which one of the spark plug cables 124 may be received from within the interior passageway defined by the shaft portion 104 and cap portion 108 and allowed to continue toward a spark plug of a vehicle engine. In various example embodiments, the perimetral upper apertures 116a may be formed to provide at least a somewhat snug friction fit to the spark plug cables 124 passing therethrough, both to help hold them in place in an evenly spaced configuration about the upper perimeter of the cap portion 108, and to aid in the faux distributor appearance. In this regard, it will be recognized that the above-discussed truncated conical protrusions 138 and corresponding semi-cylindrical protrusions 136 cooperate with the remainder of the cap portion 108 to provide the appearance of a plurality of distributor cap terminals spaced about the upper perimeter of the cap portion 108, through which ignition sparks would ordinarily be distributed among the various spark plug cables. Thus, the above-discussed truncated conical protrusions 138 and corresponding semi-cylindrical protrusions 136, in cooperation with the perimetral upper apertures 116a, serve both to maintain the organization and spacing of the modern spark plug cables 124 and to mask the appearance of the modern spark plug cables 124 by providing the illusion of a distributor using more old fashioned spark plug cables.

In the illustrated embodiment, each coaxial truncated conical protrusion 138 is arranged to align coaxially with one of the semi-cylindrical protrusions 136 and to extend upwardly from the upper circular end of the cap portion 108. However, it will be recognized that other configurations exist which may be used without departing from the spirit and scope of the present general inventive concept in order to achieve the effect of the cable holder 100 resembling a distributor. For example, numerous designs of distributors include a plurality of terminals extending generally radially outward from an upper end of the distributor. Accordingly, in numerous embodiments of cable holders constructed in accordance with several features of the present general inventive concept, the coaxial truncated conical protrusions may extend radially outwardly from the upper circular end of the cap portion 108. Those of skill in the art will recognize other configurations which may be used without departing from the spirit and scope of the present general inventive concept.

Figure 2:
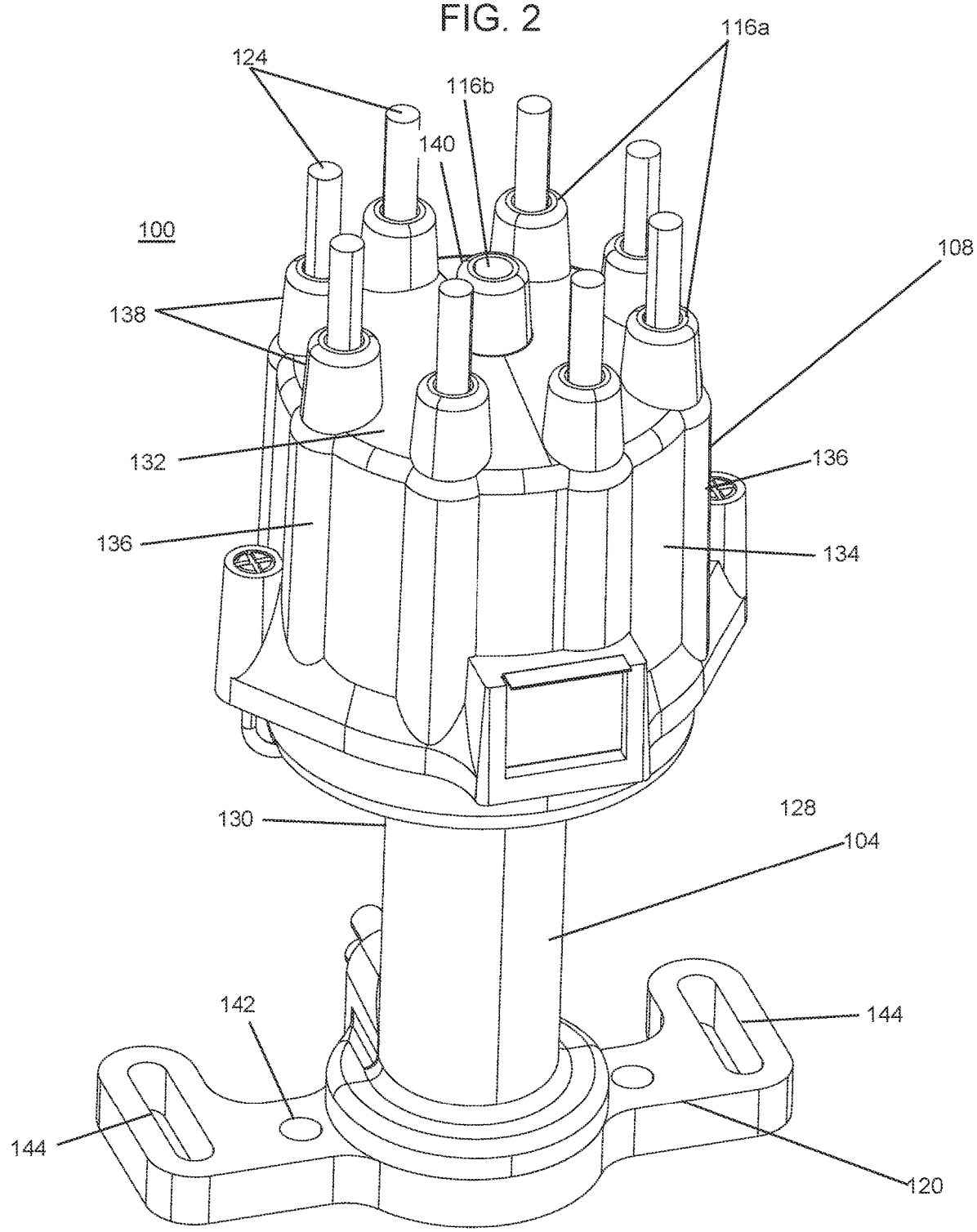
FIG. 2 illustrates a perspective view showing upper and forward surfaces of the simulated distributor cable holder of FIG. 1.
Figure 3:
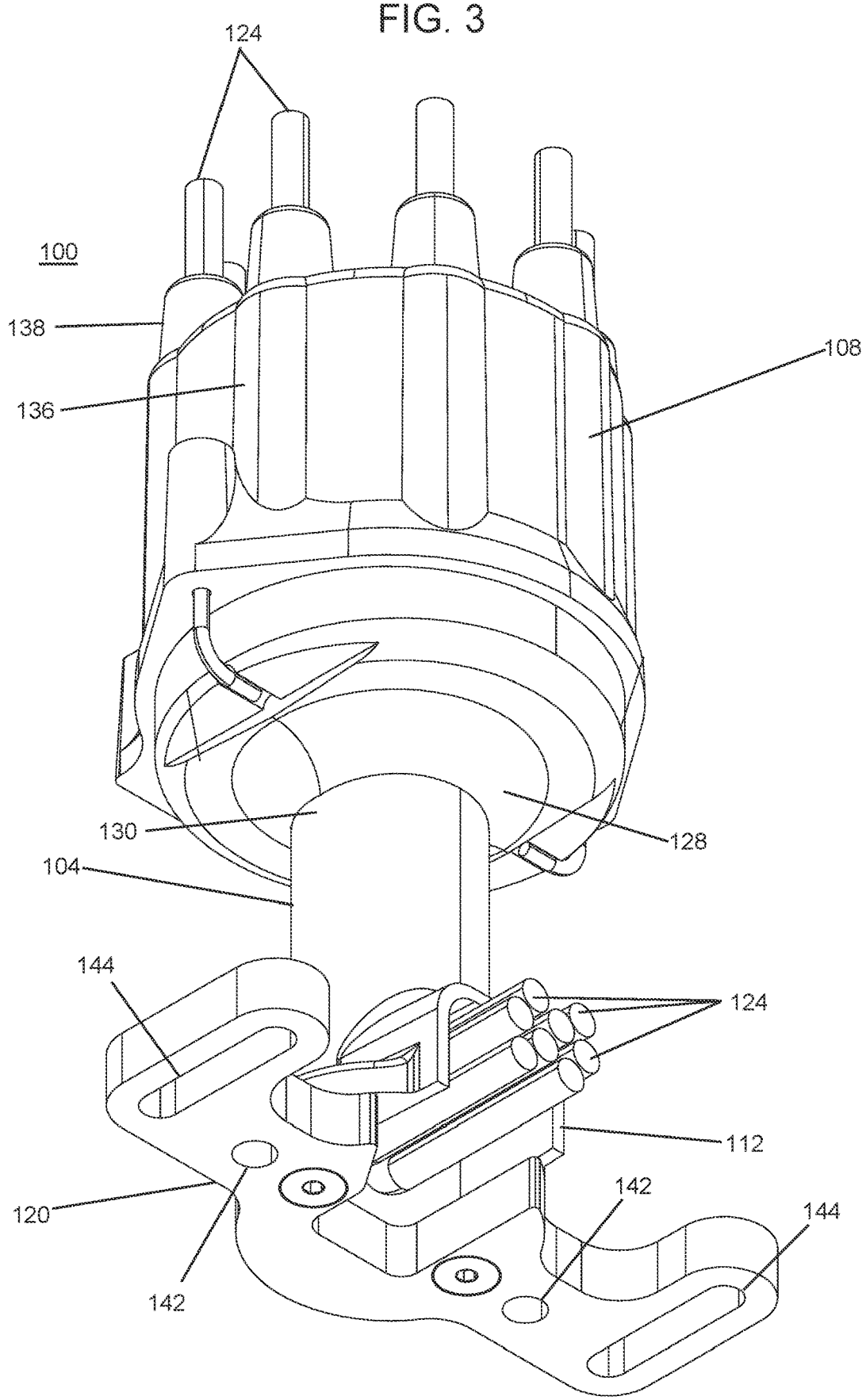
FIG. 3 illustrates a perspective view showing lower and rear surfaces of the simulated distributor cable holder of FIG. 1.
Figure 4:
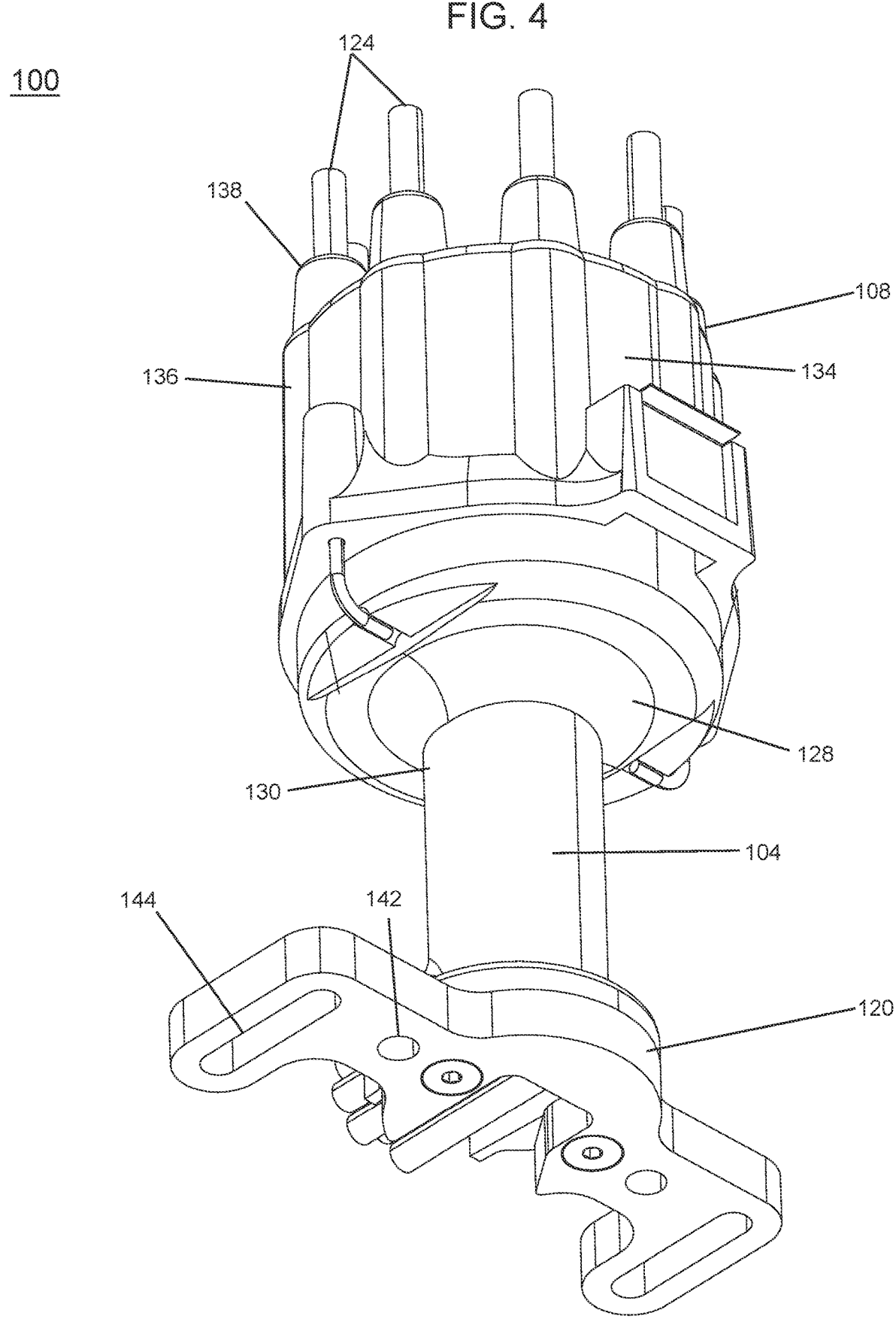
FIG. 4 illustrates a perspective view showing lower and forward surfaces of the simulated distributor cable holder of FIG. 1.

As illustrated in FIGS. 1-2, the upper apertures 116a, 116b of the cable holder 100 also include a central aperture 116b that is formed at an upper end of a truncated central conical portion 140 protruding upwardly from a central point of the cap portion upper surface. In various applications, the central aperture 116 may be used, for example, to pass a breather hose, wire, or tube (not shown) therethrough. Although not illustrated, such a breather hose may be attached to a positive crankcase ventilation (PCV) valve and be passed through the lower aperture 112 along with the spark plug cables 124, run through the cable holder 100, and passed out through the upper aperture 116b to a crankcase breather apparatus or other such emission/collection point. In this way, not only do the spark plug cables 124 appear to be emitting from the cable holder 100 in the same fashion as in a conventional distributor cap, but the breather hose can also give the appearance of being a high voltage coil cable that would run from an ignition system coil to the distributor in a conventional carburetor system. In various example embodiments, the breather hose may be run to a faux coil that acts as a crankcase breather, to further provide a functional system that gives a more enhanced appearance of a conventional ignition system with an ignition coil and distributor cap.

With such a simulated distributor cable holder 100, the spark plug cables 124 respectively connected to a plurality of fuel injection system coils may be run through the cable holder 100 to the respective spark plugs while appearing to be connected to a conventional distributor cap. The injection coils of the fuel injection system can be mounted at a desired position, such as on the firewall between the engine and the car interior and run through the lower aperture 112 of the cable holder 100 so as to appear to be an older style distributor system. To aid in the appearance of the system, the lower aperture 112 can be situated at the "back" of the cable holder 100 relative to the car, i.e., at a location along the cable holder 100 toward the rear of the car when the cable holder 100 is mounted thereto, to hide the entry of the spark plug cables 124 into the cable holder 100. While the illustrated embodiment includes eight perimetral upper apertures 116a to provide the respective spark plug cables 124 from eight fuel injection coils to the spark plugs in eight cylinders, it is noted than other configurations with fewer or more upper apertures 116a, 116b may be employed without departing from the scope of the present general inventive concept. Further, while the example embodiment of FIGS. 1-4 is described as having a single channel running through the shaft portion 104 and cap portion 108, various other example embodiments may be formed with different hollow channels so as to further organize the individual spark plug cables within the body of the simulated distributor cable holder. In various example embodiments a hose or other faux cable may be attached directly to the upper aperture 116*b* to give the appearance of a high voltage coil cable without being a hose run through the cable holder to a PCV valve.

Figure 5:
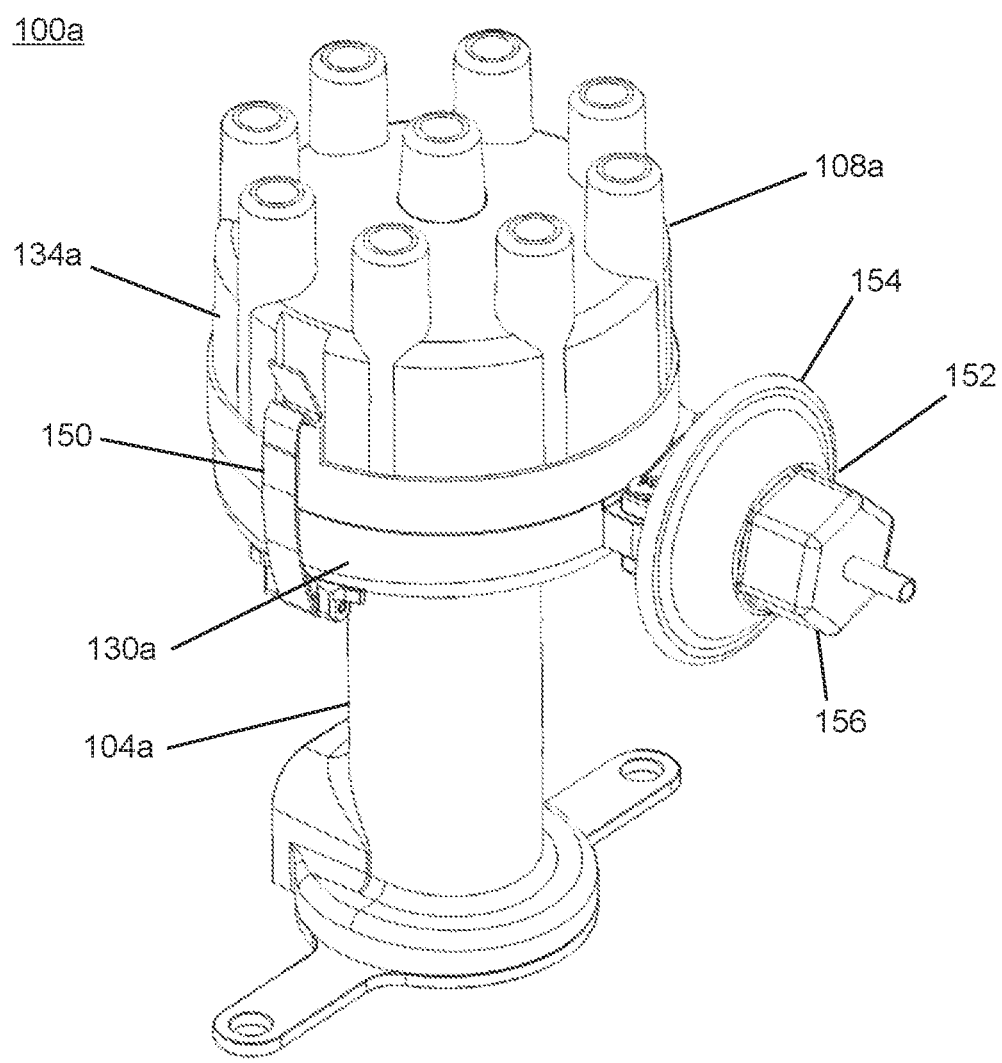
FIG. 5 illustrates a perspective view showing upper and forward surfaces of a simulated distributor cable holder according to another example embodiment of the present general inventive concept.
Figure 6:
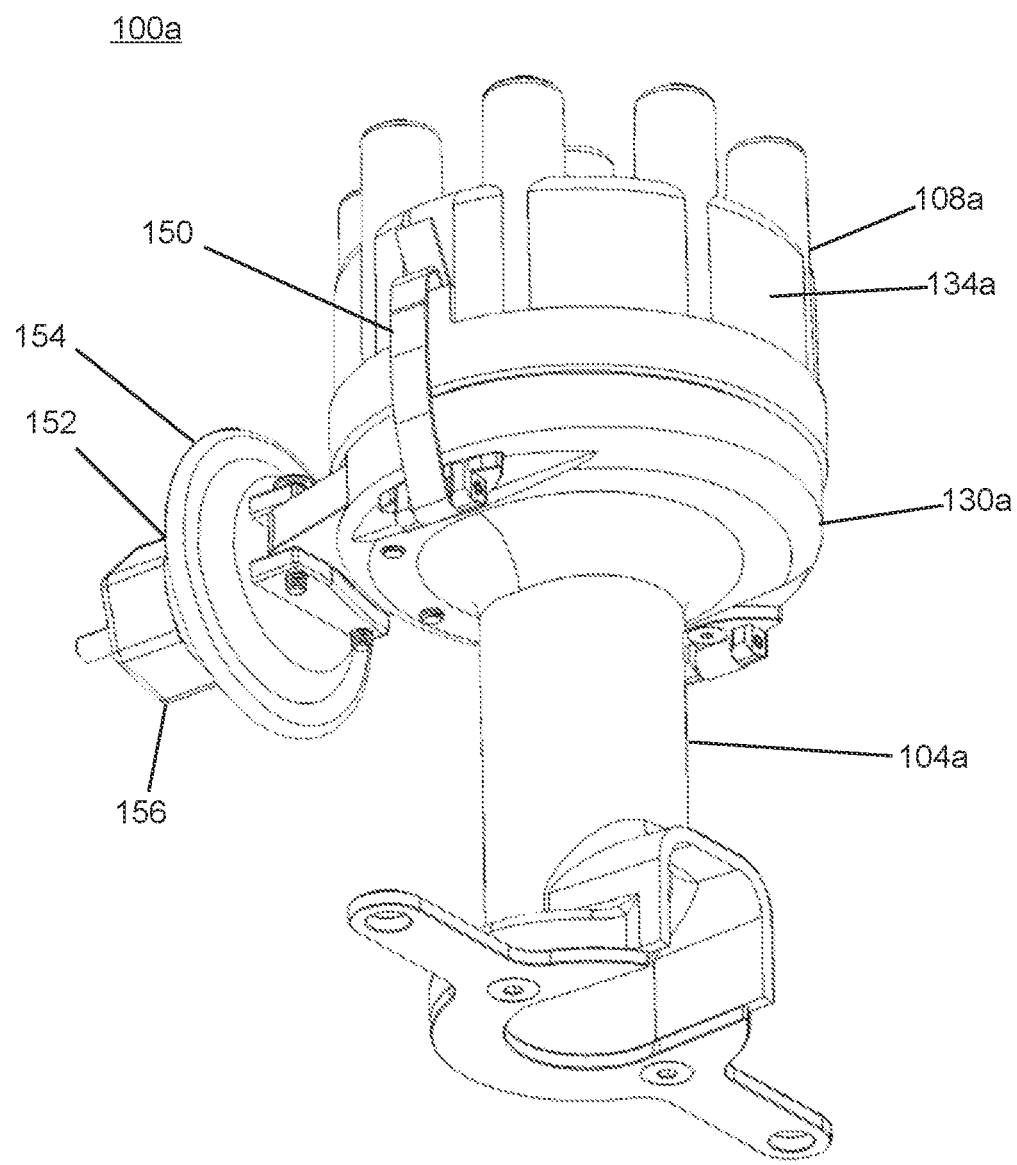
FIG. 6 illustrates a perspective view showing lower and rear surfaces of the simulated distributor cable holder of FIG. 5.

FIGS. 5 and 6 illustrate perspective views of a simulated distributor cable holder 100*a* according to another example embodiment of the present general inventive concept. In the embodiment shown in FIGS. 5 and 6, the cable holder 100*a* includes a separable cap portion 108*a* and shaft portion 104*a* which are releasably secured to one another via a pair of resilient clips 150 mounted on either side of the upper end 130*a* of the shaft portion 104*a*. The clips 150 are each configured to extend upward to overlie and engage recessed portions of the outer cylindrical side wall 134*a* of the cap portion 108*a*, thereby capturing the cap portion 108*a* in an adjacent and coaxial position proximate the shaft portion upper end 130*a*. In the illustrated embodiment, the clips 150 are each of a type commonly used in connection with distributor caps. Thus, the clips 150 contribute to the overall aesthetic of the cable holder 100*a* and the resemblance of the cable holder 100*a* to a distributor.

In the illustrated embodiment of FIGS. 5 and 6, a forward fixture 152 is provided proximate an intersection between the cap portion 108*a* and shaft portion 104*a*. The forward fixture 152 is generally shaped and oriented in relation to the cap portion 108*a* and shaft portion 104*a* so as to resemble a "vacuum advance" type of ignition timing control mechanism of a distributor. More specifically, the forward fixture 152 includes an annular, truncated conical collar portion 154 having a flared end facing toward the intersection between the cap portion 108*a* and shaft portion 104*a*, and a tapered end facing outwardly therefrom. A hexagonal nut portion 156 is provided adjacent the tapered end of the collar portion 154, the hexagonal nut portion having a central axis oriented coaxially with a central axis of the collar portion 154. In this configuration, the truncated conical collar portion 154 and hexagonal nut portion 156 of the forward fixture serve to apply an eccentric weight load to one side of the cable holder 100*a*, which may assist in dampening, reducing, or altogether eliminating resonance of the cable holder 100*a* when mounted proximate an engine of a vehicle.

Various example embodiments of the present general inventive concept may provide a simulated distributor cable holder, including a shaft portion, a cap portion provided at a top of the shaft portion, at least one lower aperture proximate a bottom of the shaft portion, and a plurality of upper apertures provided proximate a top of the cap portion, wherein a hollow path is formed between the at least one lower aperture and plurality of upper apertures to channel a plurality of cables through the cable holder. The shaft and cap portions may be configured to appear as a distributor shaft and distributor cap. The at least one lower aperture may be formed at a substantially right angle to a longitudinal axis of the shaft portion. The at least one lower aperture may extend away from the shaft portion. The plurality of upper apertures may include a predetermined number of apertures formed proximate and about a perimeter of the top of the cap portion. The apertures formed proximate and about the perimeter of the cap portion may each be configured to pass a spark plug cable therethrough. The plurality of upper apertures may include a central aperture formed proximate a center of the top of the cap portion. The central aperture may be configured to pass a crankcase breather hose therethrough. The simulated distributor cable holder may further include a base plate formed provided proximate the bottom of the shaft portion and configured to mount the cable holder to a surface. The base plate may be formed separately from the shaft portion.

Numerous variations, modifications, and additional embodiments are possible, and accordingly, all such variations, modifications, and embodiments are to be regarded as being within the spirit and scope of the present general inventive concept. For example, it will be recognized that, while the above-described embodiments contemplate the passing of a crankcase breather hose through the above-discussed center aperture 116*b*, the center aperture 116*b* may alternatively be used to pass other wires, hoses, or the like therethrough without departing from the spirit and scope of the present general inventive concept. For example, in various embodiments, one or more faux ignition coil wires or other wires or hoses may be passed through the center aperture 116*b* in order to further augment the appearance of the cable holder as resembling a distributor. Numerous additional variations and embodiments will be recognized by one of ordinary skill in the art.

Regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

It is noted that the simplified diagrams and drawings included in the present application do not illustrate all the various connections and assemblies of the various components, however, those skilled in the art will understand how to implement such connections and assemblies, based on the illustrated components, figures, and descriptions provided herein, using sound engineering judgment. Numerous variations, modification, and additional embodiments are possible, and, accordingly, all such variations, modifications, and embodiments are to be regarded as being within the spirit and scope of the present general inventive concept.

While the present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

The invention claimed is:

1. A cable holder for securing a plurality of vehicle engine cables while simulating a vehicle engine distributor, the cable holder comprising:

a hollow, cylindrical shaft portion having a first end, an opposite second end, and a diameter;

a substantially cylindrical hollow cap portion provided at a first end of the shaft portion and having an axis extending parallel to a central axis of the shaft portion, the substantially cylindrical shape of the cap portion defining a diameter greater than the diameter of the shaft portion, the cap portion cooperating with the shaft portion to define a central passageway therethrough, the cap portion further defining a plurality of upper apertures about a substantially circular perimeter of a surface of the cap portion opposite the shaft portion, each upper aperture opening to the central passageway and being sized to receive a vehicle engine cable therethrough and to support a portion of the vehicle engine cable received therethrough in separation from adjacent portions of vehicle engine cables received through adjacent apertures;

a lower aperture proximate the second end of the shaft portion and opening to the central passageway substantially perpendicular to the central axis of the shaft portion, the lower aperture being sized to receive therethrough each of the vehicle engine cables supported by the upper apertures and to hold portions of the vehicle engine cables received through the lower aperture adjacent to one another; and a base plate formed at the second end of the shaft portion and extending substantially perpendicularly to the central axis of the shaft portion outwardly therefrom, the base plate defining a plurality of openings configured to mount the cable holder to a surface;

wherein a hollow path is formed between the lower aperture and the upper apertures to channel a plurality of vehicle engine cables through the cable holder.

2. The cable holder of claim 1, wherein outer surfaces of the shaft and cap portions define shapes resembling a vehicle engine distributor shaft and a vehicle engine distributor cap.

3. The cable holder of claim 1, wherein the at least one lower aperture extends away from the shaft portion.

4. The cable holder of claim 1, wherein the plurality of upper apertures includes a predetermined number of apertures formed proximate and about a perimeter of the cap portion.

5. The cable holder of claim 4, wherein the upper apertures formed proximate and about the perimeter of the cap portion are each circular and sized to pass a spark plug cable therethrough.

6. The cable holder of claim 1, wherein the plurality of upper apertures includes a central aperture formed proximate a center of the cap portion.

7. The cable holder of claim 6, wherein the central aperture is circular and sized to pass a crankcase breather hose therethrough.

8. The cable holder of claim 1, wherein the base plate is formed separately from the shaft portion.

9. The cable holder of claim 1, wherein an outer surface of the cap portion defines a substantially cylindrical shape having a plurality of semi-cylindrical protrusions extending therefrom, each semi-cylindrical protrusion providing a guide for receiving a vehicle engine cable through a corresponding upper aperture.

10. The cable holder of claim 9, wherein each of the semi-cylindrical protrusions defined by the cap portion outer surface defines an axial dimension extending coaxial with the central axis of the cap portion.

11. The cable holder of claim 10, wherein the cap portion further defines a plurality of truncated conical protrusions extending from the cap portion, each truncated conical protrusion having a central axis defining a direction for extension of portions of the vehicle engine cables received through a corresponding upper aperture.

12. The cable holder of claim 11, each truncated conical protrusion having a central axis coaxial with a central axis of a corresponding semi-cylindrical protrusion.

13. The cable holder of claim 12, wherein a top surface of each truncated conical protrusion defines one of the upper apertures.

14. The cable holder of claim 13, wherein the cap portion further defines a central truncated conical protrusion extending from a center of the top of the cap portion, the central truncated conical protrusion having a central axis defining a direction for extension of a portion of a crankcase breather hose received through the central aperture.

15. The cable holder of claim 1 further comprising a forward fixture mounted proximate an interface of the shaft portion and the cap portion.

16. The cable holder of claim 15, the forward fixture comprising an annular, truncated conical collar portion having a flared end facing toward the interface between the cap portion and shaft portion, and a tapered end facing outwardly therefrom, and a hexagonal nut portion adjacent the tapered end of the collar portion, the hexagonal nut portion having a central axis oriented coaxially with a central axis of the collar portion.

* * * * *